US012694051B2

(12) United States Patent
Lamere et al.

(10) Patent No.: US 12,694,051 B2
(45) Date of Patent: Jul. 28, 2026

(54) SYSTEMS AND METHODS FOR GENERATING PLAYLISTS BY APPLYING SEARCH PROMPTS TO A MODEL CONFIGURED TO GENERATE STRUCTURED QUERIES

(71) Applicant: Spotify AB, Stockholm (SE)

(72) Inventors: Paul Lamere, Bath, ME (US); Joshua Pham, Cambridge, MA (US)

(73) Assignee: Spotify AB, Stockholm (SE)

( * ) Notice: Subject to any disclaimer, the term of this patent is extended or adjusted under 35 U.S.C. 154(b) by 0 days.

(21) Appl. No.: 18/760,758

(22) Filed: Jul. 1, 2024

(65) Prior Publication Data

US 2025/0265289 A1      Aug. 21, 2025

Related U.S. Application Data

(60) Provisional application No. 63/554,406, filed on Feb. 16, 2024.

(51) Int. Cl.
*G06F 16/00* (2019.01)
*G06F 16/438* (2019.01)
(52) U.S. Cl.
CPC ............................... *G06F 16/4387* (2019.01)
(58) Field of Classification Search
CPC .................................................. G06F 16/4387
USPC ......................................................... 707/769
See application file for complete search history.

(56) References Cited

U.S. PATENT DOCUMENTS

2018/0052928 A1      2/2018   Liu et al.
2023/0350968 A1*   11/2023   Mejia ................... G06F 16/9577
2025/0103826 A1*     3/2025   Dicklin ............... G06F 16/9032

FOREIGN PATENT DOCUMENTS

CN       111373391 A       7/2020

OTHER PUBLICATIONS

Microsoft, "Create a vector query in Azure AI Search", Microsoft. com, Jun. 12, 2024, retrieved from https://learn.microsoft.com/en-us/azure/search/vector-search-how-to-query?tabs-query-2023-11-01%2Cfilter-2023-11-01, 8 pgs.
Shorten, "What is Ref2Vec and why you need it for your recommendation system", Weaviate.com, Nov. 23, 2022, retrieved from https://weaviate.io/blog/ref2vec-centroid, 10 pgs.

* cited by examiner

*Primary Examiner* — Raquel Perez-Arroyo

(74) *Attorney, Agent, or Firm* — Morgan, Lewis & Bockius LLP

(57) ABSTRACT

An electronic device associated with a media-providing service stores, in a vector space, a plurality of respective vector representations for respective media content items. The electronic device receives a user input, including a text string. The electronic device generates, using a neural network, a structured query based on the text string. The electronic device determines, based on the structured query, whether to generate a vector representation of a portion of the text string. When the electronic device determines to generate the vector representation of the portion of the text string, it generates the vector representation of the portion of the text string, wherein the vector representation is embedded in the vector space, and identifies a set of media items using the vector representation of the portion of the text string. And the electronic device provides one or more select media items from the set of media items to a user.

18 Claims, 6 Drawing Sheets

Figure 5A:
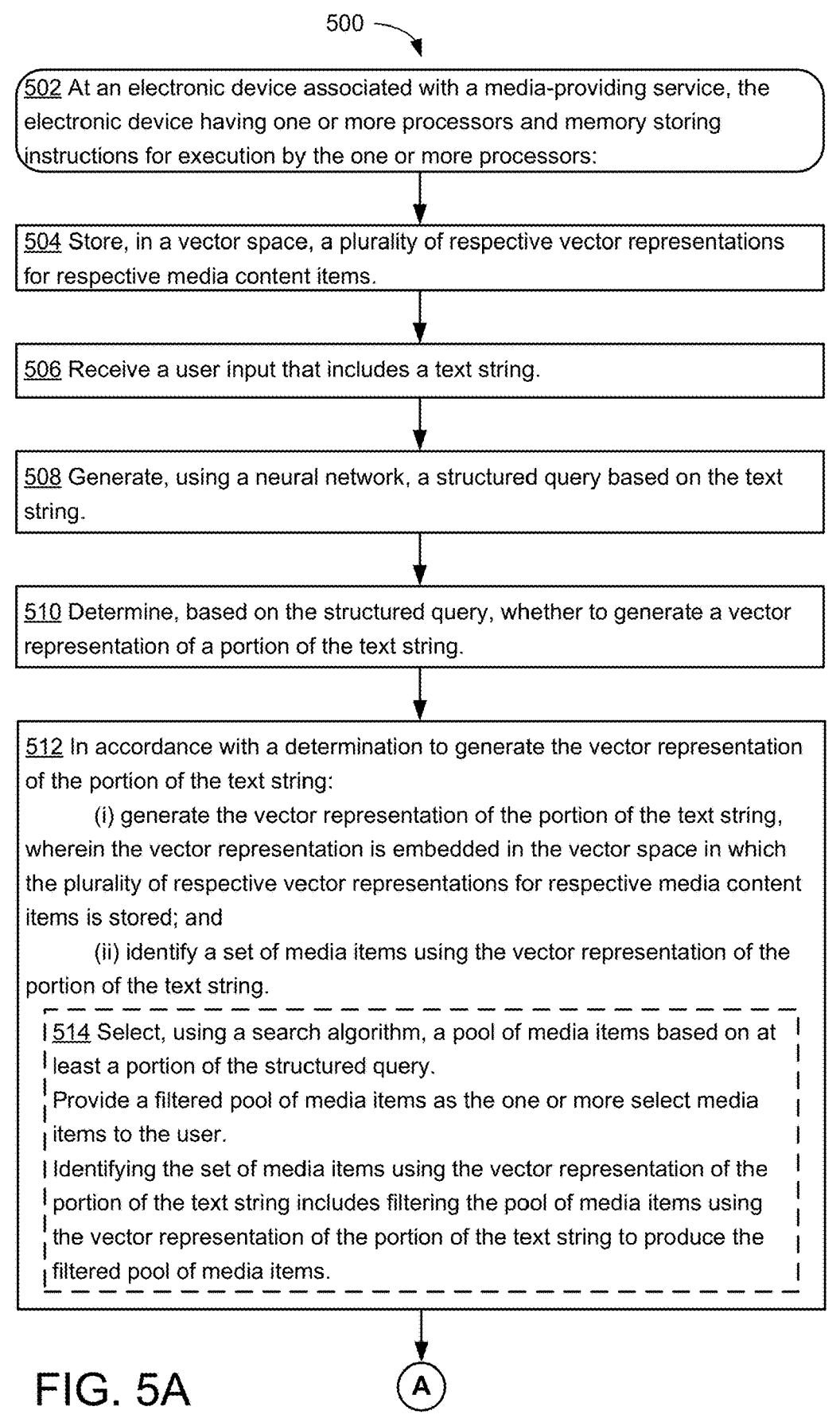

500

502 At an electronic device associated with a media-providing service, the electronic device having one or more processors and memory storing instructions for execution by the one or more processors:

504 Store, in a vector space, a plurality of respective vector representations for respective media content items.

506 Receive a user input that includes a text string.

508 Generate, using a neural network, a structured query based on the text string.

510 Determine, based on the structured query, whether to generate a vector representation of a portion of the text string.

512 In accordance with a determination to generate the vector representation of the portion of the text string:

(i) generate the vector representation of the portion of the text string, wherein the vector representation is embedded in the vector space in which the plurality of respective vector representations for respective media content items is stored; and (ii) identify a set of media items using the vector representation of the portion of the text string.

514 Select, using a search algorithm, a pool of media items based on at least a portion of the structured query.

Provide a filtered pool of media items as the one or more select media items to the user.

Identifying the set of media items using the vector representation of the portion of the text string includes filtering the pool of media items using the vector representation of the portion of the text string to produce the filtered pool of media items.

FIG. 5A                    (A)

SYSTEMS AND METHODS FOR GENERATING PLAYLISTS BY APPLYING SEARCH PROMPTS TO A MODEL CONFIGURED TO GENERATE STRUCTURED QUERIES

RELATED APPLICATIONS

This application claims priority to U.S. Prov. App. No. 63/554,406, filed Feb. 16, 2024, which is incorporated by reference herein in its entirety.

TECHNICAL FIELD

The disclosed embodiments relate generally to providing queries for media content items, and, in particular, to a system that includes a neural network that generates structured queries from unstructured search prompts.

BACKGROUND

Recent years have shown a remarkable growth in consumption of digital goods such as digital music, movies, books, and podcasts, among many others. The overwhelmingly large number of these goods often makes navigation and discovery of new digital goods an extremely difficult task. To cope with the constantly growing complexity of navigating the large number of goods, users create and select playlists to easily organize and access media items, including playlists curated by the users themselves and playlists curated by other parties, such as content providers.

A neural network is a type of machine-learning model that is capable of performing various natural-language processing tasks. Some neural networks, such as large-language models (LLMs), allow users to request information (e.g., textual outputs, sets of media items) using highly-general (e.g., broad intent) queries by leveraging the world knowledge obtained by training the neural networks on large corpuses of non-specific training data for the purpose of responding to users' broad intent queries in a probabilistic manner. Although the neural networks are trained with non-specific training data, they learn about general patterns in text, which can be used to analyze user queries (e.g., input text) to determine the concepts or phrases that are most likely to be responsive to the user queries.

Although recent advances in LLMs make them a useful tool for handling a wide variety of unstructured user queries, there are drawbacks to exclusively using LLMs for particular tasks. For example, LLMs conventionally have broad knowledge (e.g., world knowledge) but often lack detailed information (e.g., information about a plurality of media items, such as the tempo of tracks, and the like). In contrast, this type of information is often stored (e.g., as metadata) by media-providing services, for performing various operations associated with the media-providing service. Querying with LLMs is also generally more computationally and time intensive than performing similar search operations with other models (e.g., vector models, index-based search algorithms).

SUMMARY

In the disclosed embodiments, systems and methods are provided for receiving a natural language query (e.g., a text string) from a user and, using a neural network, determining a computationally-efficient way to handle the query to identify a set of media items (e.g., a playlist) to provide to the user (e.g., as part of a user-specific response to the natural language query). For example, the system may produce a structured query from the natural language query, wherein the structured query improves the computational efficiency as compared to directly handling the natural query. In some circumstances, the system (and in particular the neural network) may determine that it is preferable to utilize a neural network's world knowledge to generate results, which may be used in lieu of or in combination with the generated structured query. In some embodiments, the structured query may include a call to a model (e.g., a natural language model that produces a vector of portions of the text string), where the vector can be applied to a vector space that includes vectorized representations of media items to identify a set of media items that are most similar to the predicted intent of the user's query (e.g., based on a nearest neighbor approach). Further, the structured query can also include instructions to filter and/or sequence the media items that were identified based on the vectorized representation of the portion of the query.

By providing a flexible methodology for using a neural network to optionally generate a structured query for use by another component (e.g., a search algorithm, a vector-space model) based on the content of input text provided by a user, and only using the world knowledge of the neural network to identify media items when the input text includes suitable content for doing so, the systems and methods described herein provide improved processing times as compared to conventional systems that typically make multiple passes through a computationally-heavy neural network to directly produce the desired outputs every time input text is provided to the neural network.

To that end, in accordance with some embodiments, a method is performed at an electronic device associated with a media-providing service. The electronic device has one or more processors and memory storing instructions for execution by the one or more processors. The method includes storing, in a vector space, a plurality of respective vector representations for respective media content items. The method includes receiving a user input that includes a text string. The method includes generating, using a neural network, a structured query based on the text string. The method includes determining, based on the structured query, whether to generate a vector representation of a portion of the text string. The method includes, in accordance with a determination to generate the vector representation of the portion of the text string, generating the vector representation of the portion of the text string, wherein the vector representation is embedded in the vector space in which the plurality of respective vector representations for respective media content items is stored, and identifying a set of media items using the vector representation of the portion of the text string. And the method includes providing one or more select media items from the set of media items to a user of the media-providing service.

In accordance with some embodiments, an electronic device is provided. The electronic device includes one or more processors and memory storing one or more programs. The one or more programs include instructions for performing any of the methods described herein.

In accordance with some embodiments, a non-transitory computer-readable storage medium is provided. The non-transitory computer-readable storage medium stores one or more programs for execution by an electronic device with one or more processors. The one or more programs comprising instructions for performing any of the methods described herein.

Thus, systems are provided with improved methods for identifying sets of media items to provide to users including optionally using a neural network to generate a structured query based on a user-input text string, and/or by directly outputting information about the set of media items by applying the text string to the world knowledge of the neural network.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings and specification.

FIGS. 5A-5B are flow diagrams illustrating a method of identifying a set of media items (e.g., a playlist) to provide to a user using a neural network that is configured to generate structured queries based on user inputs that include text strings, in accordance with some embodiments.

DETAILED DESCRIPTION

Figure 1:
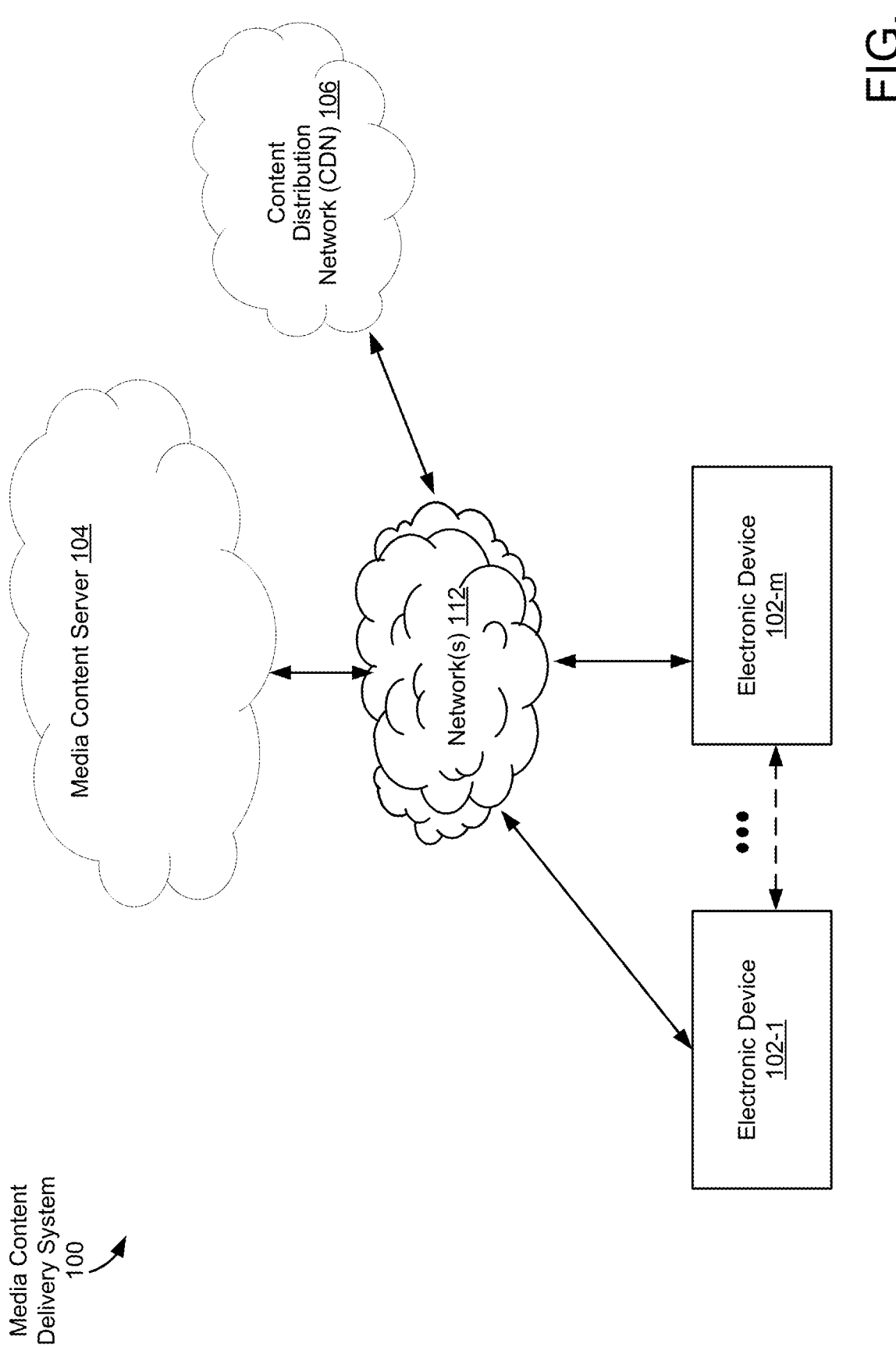
FIG. 1 is a block diagram illustrating a media content delivery system, in accordance with some embodiments.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first electronic device could be termed a second electronic device, and, similarly, a second electronic device could be termed a first electronic device, without departing from the scope of the various described embodiments. The first electronic device and the second electronic device are both electronic devices, but they are not the same electronic device.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including,"

"comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

As described herein, the world knowledge of a neural network is the information that the neural network has learned about the world through a corpus of generalized information (e.g., information non-specific to the media providing services described herein) that it was trained on. That is, the world knowledge includes the information explicitly provided to and inferred by the neural network before it is additionally trained for a specific context and/or purpose (e.g., by fine-tuning the neural network).

As described herein, a structured query is a symbolic representation of a query. In some embodiments, the structured queries described herein are related to some portion or all of a user-input text string (e.g., an unstructured query, a search prompt). For example, the structured query may be a script-like input that is configured to be provided to a code interpreter that includes media-item-identification rules that are configured to be executed by a particular application programming interface (API) or other scripting language that is configured to identify media items based on respective structured queries (e.g., user_top_tracks( )|match ("genre", "metal")|range_filter("bpm", 125, 130)|sort_asc ("energy")|first(20)). In some embodiments, a structured query includes media-item-identification rules for one or more of the following operations: (1) item selection, in which a pool of items is created based upon criteria in or derived from the user-input text string or another source ('meta', 'chill beats', etc.); (2) filtering, in which items in the pool are filtered based on one or more criteria in or derived from the user-input text string or another source (tempo, energy, release date, etc); (3) ordering—items in the pool are ordered based on one or more factors (energy, tempo, familiarity, etc); and (4) sequencing—a final list of items selected and sequenced for the user. In some embodiments, sequencing ensures good playlist hygiene (no duplicates, artist separation, etc.).

FIG. 1 is a block diagram illustrating a media content delivery system 100, in accordance with some embodiments. The media content delivery system 100 includes one or more electronic devices 102 (e.g., electronic device 102-1 to electronic device 102-*m*, where m is an integer greater than one), one or more media content servers 104, and/or one or more content distribution networks (CDNs) 106. The one or more media content servers 104 are associated with (e.g., at least partially compose) a media-providing service. The one or more CDNs 106 store and/or provide one or more content items (e.g., to electronic devices 102). In some embodiments, the CDNs 106 are included in the media content servers 104. One or more networks 112 communicably couple the components of the media content delivery system 100. In some embodiments, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

In some embodiments, an electronic device 102 is associated with one or more users. In some embodiments, an electronic device 102 is a personal computer, mobile electronic device, wearable computing device, laptop computer, tablet computer, mobile phone, feature phone, smart phone, an infotainment system, digital media player, a speaker, television (TV), and/or any other electronic device capable of presenting media content (e.g., controlling playback of media items, such as music tracks, podcasts, videos, etc.). Electronic devices 102 may connect to each other wirelessly and/or through a wired connection (e.g., directly through an interface, such as an HDMI interface). In some embodiments, electronic devices 102-1 and 102-m are the same type of device (e.g., electronic device 102-1 and electronic device 102-m are both speakers). Alternatively, electronic device 102-1 and electronic device 102-m include two or more distinct types of devices.

In some embodiments, electronic devices 102-1 and 102-m send and receive media-control information through network(s) 112. For example, electronic devices 102-1 and 102-m send media control requests (e.g., requests to play music, podcasts, movies, videos, or other media items, or playlists thereof) to media content server 104 through network(s) 112. Additionally, electronic devices 102-1 and 102-m, in some embodiments, also send indications of media content items to media content server 104 through network(s) 112. In some embodiments, the media content items are uploaded to electronic devices 102-1 and 102-m before the electronic devices forward the media content items to media content server 104.

In some embodiments, electronic device 102-1 communicates directly with electronic device 102-m (e.g., as illustrated by the dotted-line arrow), or any other electronic device 102. As illustrated in FIG. 1, electronic device 102-1 is able to communicate directly (e.g., through a wired connection and/or through a short-range wireless signal, such as those associated with personal-area-network (e.g., BLUETOOTH/BLE) communication technologies, radio-frequency-based near-field communication technologies, infrared communication technologies, etc.) with electronic device 102-m. In some embodiments, electronic device 102-1 communicates with electronic device 102-m through network(s) 112. In some embodiments, electronic device 102-1 uses the direct connection with electronic device 102-m to stream content (e.g., data for media items) for playback on the electronic device 102-m.

In some embodiments, electronic device 102-1 and/or electronic device 102-m include a media application 222 (FIG. 2) that allows a respective user of the respective electronic device to upload (e.g., to media content server 104), browse, request (e.g., for playback at the electronic device 102), and/or present media content (e.g., control playback of music tracks, playlists, videos, etc.). In some embodiments, one or more media content items are stored locally by an electronic device 102 (e.g., in memory 212 of the electronic device 102, FIG. 2). In some embodiments, one or more media content items are received by an electronic device 102 in a data stream (e.g., from the CDN 106 and/or from the media content server 104). The electronic device(s) 102 are capable of receiving media content (e.g., from the CDN 106) and presenting the received media content. For example, electronic device 102-1 may be a component of a network-connected audio/video system (e.g., a home entertainment system, a radio/alarm clock with a digital display, or an infotainment system of a vehicle). In some embodiments, the CDN 106 sends media content to the electronic device(s) 102.

In some embodiments, the CDN 106 stores and provides media content (e.g., media content requested by the media application 222 of electronic device 102) to electronic device 102 via the network(s) 112. Content (also referred to herein as "media items," "media content items," and "content items") is received, stored, and/or served by the CDN 106. In some embodiments, content includes audio (e.g., music, spoken word, podcasts, audiobooks, etc.), video (e.g., short-form videos, music videos, television shows, movies, clips, previews, etc.), text (e.g., articles, blog posts, emails, etc.), image data (e.g., image files, photographs, drawings, renderings, etc.), games (e.g., 2- or 3-dimensional graphics-based computer games, etc.), or any combination of content types (e.g., web pages that include any combination of the foregoing types of content or other content not explicitly listed). In some embodiments, content includes one or more audio media items (also referred to herein as "audio items," "tracks," and/or "audio tracks").

In some embodiments, media content server 104 receives media requests (e.g., commands) from electronic devices 102. In some embodiments, media content server 104 includes a voice API, a connect API, and/or key service. In some embodiments, media content server 104 validates (e.g., using key service) electronic devices 102 by exchanging one or more keys (e.g., tokens) with electronic device(s) 102.

In some embodiments, media content server 104 and/or CDN 106 stores one or more playlists (e.g., information indicating a set of media content items). For example, a playlist is a set of media content items defined by a user and/or defined by an editor associated with a media-providing service. The description of the media content server 104 as a "server" is intended as a functional description of the devices, systems, processor cores, and/or other components that provide the functionality attributed to the media content server 104. It will be understood that the media content server 104 may be a single server computer, or may be multiple server computers. Moreover, the media content server 104 may be coupled to CDN 106 and/or other servers and/or server systems, or other devices, such as other client devices, databases, content delivery networks (e.g., peer-to-peer networks), network caches, and the like. In some embodiments, the media content server 104 is implemented by multiple computing devices working together to perform the actions of a server system (e.g., cloud computing).

Figure 2:
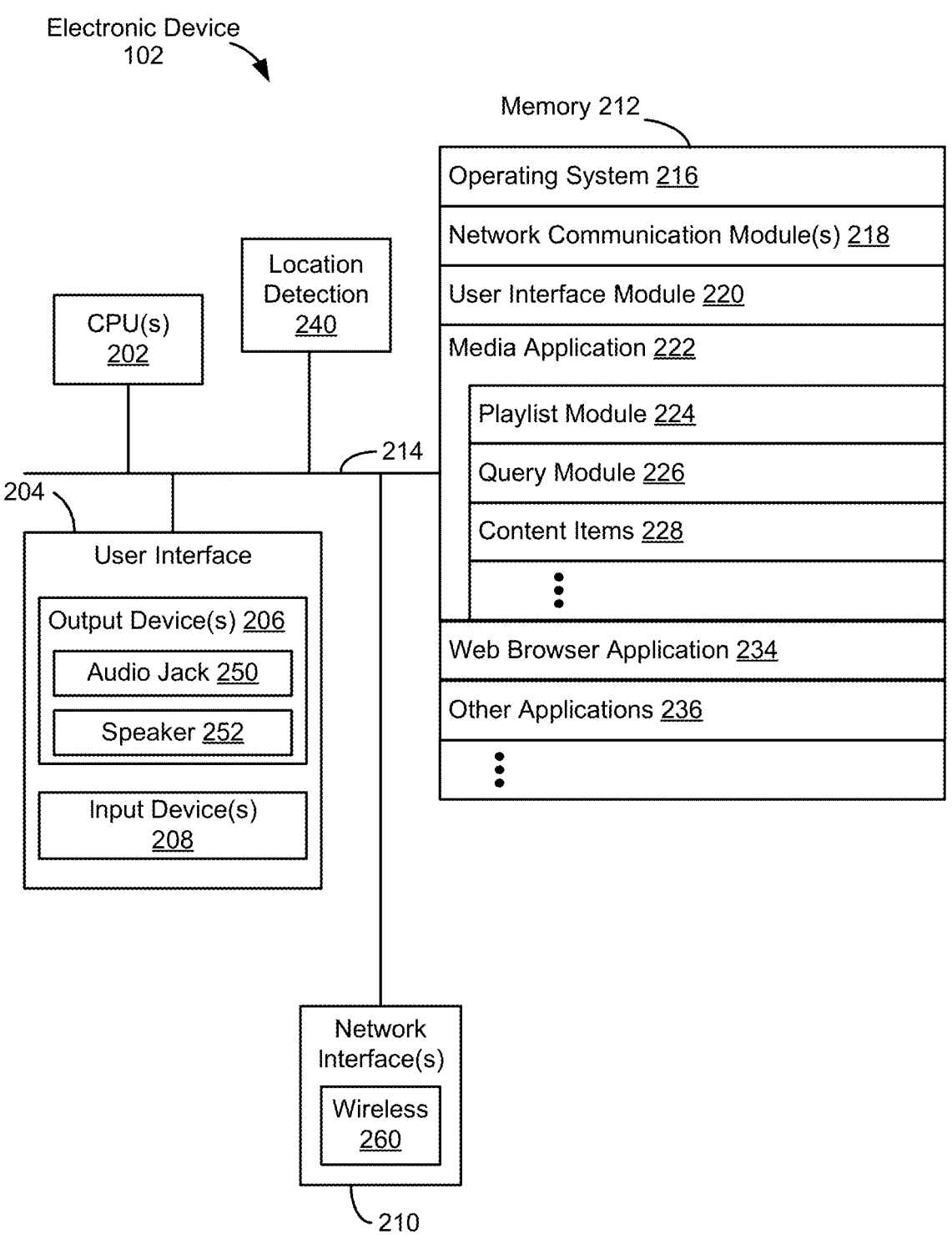
FIG. 2 is a block diagram illustrating an electronic device, in accordance with some embodiments.

FIG. 2 is a block diagram illustrating an electronic device 102 (e.g., electronic device 102-1 and/or electronic device 102-m, FIG. 1), in accordance with some embodiments. The electronic device 102 includes one or more central processing units (CPU(s), i.e., processors or cores) 202, one or more network (or other communications) interfaces 210, memory 212, and one or more communication buses 214 for interconnecting these components. The communication buses 214 optionally include circuitry (sometimes called a chipset) that interconnects and controls communications between system components.

In some embodiments, the electronic device 102 includes a user interface 204, including output device(s) 206 and/or input device(s) 208. In some embodiments, the input devices

208 include a keyboard, mouse, or track pad. Alternatively, or in addition, in some embodiments, the user interface 204 includes a display device that includes a touch-sensitive surface, in which case the display device is a touch-sensitive display. In electronic devices that have a touch-sensitive display, a physical keyboard is optional (e.g., a soft keyboard may be displayed when keyboard entry is needed). In some embodiments, the output devices (e.g., output device(s) 206) include a speaker 252 (e.g., speakerphone device) and/or an audio jack 250 (or other physical output connection port) for connecting to speakers, earphones, headphones, or other external listening devices. Furthermore, some electronic devices 102 use a microphone and voice recognition device to supplement or replace the keyboard. Optionally, the electronic device 102 includes an audio input device (e.g., a microphone) to capture audio (e.g., speech from a user).

Optionally, the electronic device 102 includes a location-detection device 240, such as a global navigation satellite system (GNSS) (e.g., GPS (global positioning system), GLONASS, Galileo, BeiDou) or other geo-location receiver, and/or location-detection software for determining the location of the electronic device 102 (e.g., module for finding a position of the electronic device 102 using trilateration of measured signal strengths for nearby devices).

In some embodiments, the one or more network interfaces 210 include wireless and/or wired interfaces for receiving data from and/or transmitting data to other electronic devices 102, a media content server 104, a CDN 106, and/or other devices or systems. In some embodiments, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, the one or more network interfaces 210 include a wireless interface 260 for enabling wireless data communications with other electronic devices 102, media presentations systems, and/or or other wireless (e.g., Bluetooth-compatible) devices (e.g., for streaming audio data to the media presentations system of an automobile). Furthermore, in some embodiments, the wireless interface 260 (or a different communications interface of the one or more network interfaces 210) enables data communications with other WLAN-compatible devices (e.g., a media presentations system) and/or the media content server 104 (via the one or more network(s) 112, FIG. 1).

In some embodiments, electronic device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some embodiments, memory 212 or the non-transitory computer-readable storage medium of memory 212 stores the following programs, modules, and data structures, or a subset or superset thereof:

- an operating system 216 that includes procedures for handling various basic system services and for performing hardware-dependent tasks;
- network communication module(s) 218 for connecting the client device 102 to other computing devices (e.g., media presentation system(s), media content server 104, and/or other client devices) via the one or more network interface(s) 210 (wired or wireless) connected to one or more network(s) 112;
- a user interface module 220 that receives commands and/or inputs from a user via the user interface 204 (e.g., from the input devices 208) and provides outputs for playback and/or display on the user interface 204 (e.g., the output devices 206);
- a media application 222 (e.g., an application for accessing a media-providing service of a media content provider associated with media content server 104) for uploading, browsing, receiving, processing, presenting, and/or requesting playback of media (e.g., media items). In some embodiments, media application 222 includes a media player, a streaming media application, and/or any other appropriate application or component of an application. In some embodiments, media application 222 is used to monitor, store, and/or transmit (e.g., to media content server 104) data associated with user behavior. In some embodiments, media application 222 also includes the following modules (or sets of instructions), or a subset or superset thereof:
  - a playlist module 224 for storing sets of media items for playback in a predefined order, the media items selected by the user (e.g., for a user-curated playlist) and/or the media items curated without user input (e.g., by the media content provider);
  - a query module 226 for identifying sets of media items to provide to a user based on unstructured queries of input text (e.g., search prompts) provided to the playlisting module (e.g., via a search prompt);
  - a content items module 228 for storing media items, including audio items such as podcasts and songs, for playback and/or for forwarding requests for media content items to the media content server;
- a web browser application 234 for accessing, viewing, and interacting with web sites; and
- other applications 236, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

Figure 3:
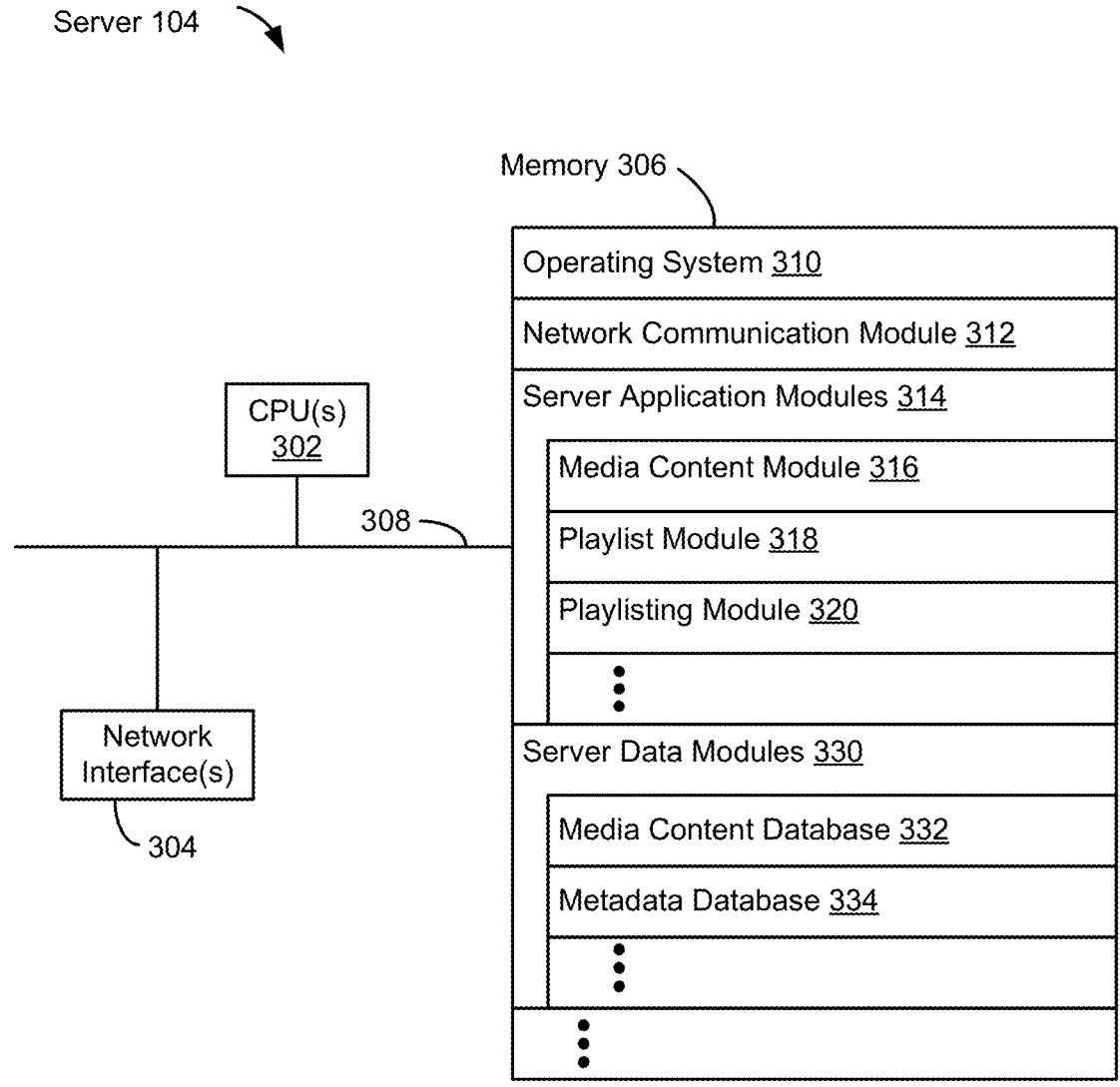
FIG. 3 is a block diagram illustrating a media content server, in accordance with some embodiments.

FIG. 3 is a block diagram illustrating a media content server 104, in accordance with some embodiments. The media content server 104 typically includes one or more central processing units/cores (CPUs) 302, one or more network interfaces 304, memory 306, and one or more communication buses 308 for interconnecting these components.

Memory 306 includes high-speed random-access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306 optionally includes one or more storage devices remotely located from one or more CPUs 302. Memory 306, or, alternatively, the non-volatile solid-state memory device(s) within memory 306, includes a non-transitory computer-readable storage medium. In some embodiments, memory 306, or the non-transitory computer-readable storage medium of memory 306, stores the following programs, modules and data structures, or a subset or superset thereof:

an operating system 310 that includes procedures for handling various basic system services and for performing hardware-dependent tasks;

a network communication module 312 that is used for connecting the media content server 104 to other computing devices via one or more network interfaces 304 (wired or wireless) connected to one or more networks 112;

one or more server application modules 314 for performing various functions with respect to providing and managing a content service, the server application modules 314 including, but not limited to, one or more of:

a media content module 316 for storing one or more media content items and/or sending (e.g., streaming), to the electronic device, one or more requested media content item(s);

a playlist module 318 for storing and/or providing (e.g., streaming) sets of media content items to the electronic device;

a playlisting module 320 for identifying sets of media items to provide to a user based on unstructured queries of input text (e.g., search prompts) provided to the playlisting module (e.g., via a search prompt);

one or more server data module(s) 330 for handling the storage of and/or access to media items and/or metadata relating to the media items; in some embodiments, the one or more server data module(s) 330 include:

media content database 332 for storing media items; and a metadata database 334 for storing metadata relating to the media items, including a genre associated with the respective media items.

In some embodiments, the media content server 104 includes web or Hypertext Transfer Protocol (HTTP) servers, File Transfer Protocol (FTP) servers, as well as web pages and applications implemented using Common Gateway Interface (CGI) script, PHP Hypertext Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules stored in memory 212 and 306 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various embodiments. In some embodiments, memory 212 and 306 optionally store a subset or superset of the respective modules and data structures identified above. Furthermore, memory 212 and 306 optionally store additional modules and data structures not described above.

Although FIG. 3 illustrates the media content server 104 in accordance with some embodiments, FIG. 3 is intended more as a functional description of the various features that may be present in one or more media content servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. In some embodiments, media content database 332 and/or metadata database 334 are stored on devices (e.g., CDN 106) that are accessed by media content server 104. The actual number of servers used to implement the media content server 104, and how features are allocated among them, will vary from one implementation to another and, optionally, depends in part on the amount of data traffic that the server system handles during peak usage periods as well as during average usage periods.

Figure 4:
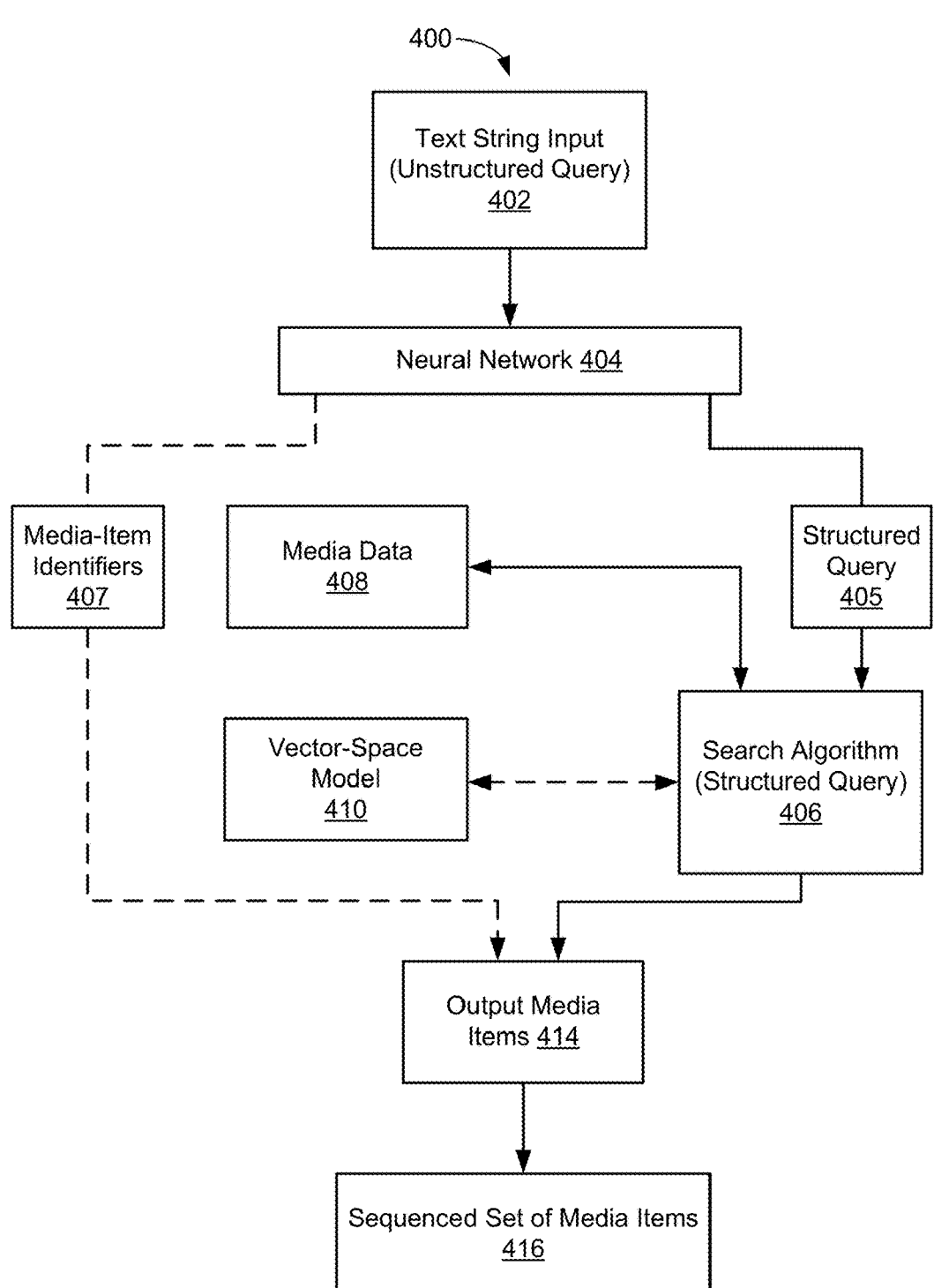
FIG. 4 is a block diagram of a system for identifying a set of media items (e.g., a playlist), based on content of a text string (e.g., an unstructured search query, a search prompt) provided to the system, in accordance with some embodiments.

FIG. 4 is a block diagram of a system 400 (which may be an example of playlisting module 320) for identifying sets of media items (e.g., playlists), based on content of a text string 402 (e.g., an unstructured search query, a search prompt) provided to the system 400, in accordance with some embodiments. The sets of media items may be identified to be provided to a particular user of an electronic device (e.g., the electronic device 102-1) based on their entering the text string 402 or a different text string to a search user interface, in accordance with some embodiments. In some embodiments, at least some of the data associated with the system 400 (e.g., computer-readable storage media, including instructions for performing operations of the described methods and/or data for storing information related to the user's preferences, etc.) are stored at a server associated with a media-providing service (e.g., media content server 104) that is physically separate from but in electronic communication with the electronic device 102-1.

In some embodiments, the system 400 includes received prompts (e.g., text strings) from client devices having one or more user interfaces associated with the media-providing service (e.g., a discovery user interface configured with a search user interface element for receiving user search queries for media items to be provided for playback by the media-providing service). In accordance with some embodiments, the system 400 receives the text string 402 based on a user inputting the text string 402 to a search user interface element (e.g., "funky music for a beach party"). In some embodiments, the text string 402 is selected from and/or inferred from different textual content provided by the user (e.g., based on a predicted intent of the content of the text string that was input by the user). In some embodiments, the system 400 is responsive to audio (e.g., voice) input by the user, and is configured to determine content of the text string 402 based on received data corresponding to the audio input.

In accordance with some embodiments, the system 400 includes a neural network 404 (e.g., a generative model, such as an LLM) that receives the text string 402. Based on receiving the text string 402, the neural network 404 determines a set of operations to perform based on the content of the text string 402. For example, in accordance with some embodiments described herein, the neural network 404 is configured to, in some circumstances, output a structured query 405 (e.g., set of instructions, such as a script written in a custom playlist programming language) based on the at least a portion of the content of the text string 402. In some embodiments, the neural network is configured to generate the structured query 405 based on world knowledge and/or domain specific knowledge (e.g., data specific to the media providing service) provided to the neural network 404 and/or information (e.g., sets of rules, a manual) for generating structured queries based on input text. For example, a particular word or phrase in respective input text (e.g., "upbeat") may result in a portion of the structured query 405 specifying a particular range of beats per minute (BPM) for identifying a subset of media items that have a BPM value in that range (e.g., "range_filter("bpm", 125, 130)).

In accordance with some embodiments, after the neural network 404 outputs the structured query 405 based on the text string 402, the structured query 405 is provided to another module of the system 400 (e.g., a search algorithm 406), which may be configured to receive and process the structured query 405 as part of the process performed by the system 400 to identify a set of media items based on the text string 402. In some embodiments, the neural network 404 is trained with information about how to generate structured queries to provide to the search algorithm 406, in addition or alternatively to the general information (e.g., world knowledge) used to train the neural network 404. For example, the neural network 404 may be provided with a set of rules (e.g., an application programming interface (API)) for using structured queries to identify media items with the search algorithm 412. In some embodiments, a plurality of structured queries (e.g., synthetic structured queries) may be provided to the neural network 404 (e.g., along with corresponding input text that, if provided as an input to the neural network 404, would produce the respective synthetic structured queries output by the neural network 404.

In accordance with some embodiments, as part of generating the structured query 405, the neural network 404 may determine whether to include a portion of the structured query 405 for generating a vector representation that represents at least a portion of the text string 402. That is, in accordance with some embodiments, the neural network may output, as part of the structured query 405, a portion of the structured query that causes the search algorithm 406 to identify respective media items based on a vectorized representation of at least a portion of the text string 402. For example, the structured query 405 that is output by the neural network 404 may include information that can be provided directly to a vector-space model 410 to identify vectorized representations of respective media items that are similar (e.g., via cosine similarity) to the vectorized representation of the portion of the text string 402. In some embodiments, the structured query 405 that is output by the neural network 404 includes instructions for the module receiving the structured query (e.g., the search algorithm 406) to generate the vectorized representation of the portion of the text string.

In some embodiments, the vector-space model 410 includes a plurality of vector representations associated with respective media items that are available to be played back by the media-providing service. In some embodiments, the neural network 404 (or a different neural network of the system 400) is trained to generate vectorized representations of portions of text by providing, as an input to the neural network 404 or another neural network of the system 400, synthetic prompts and corresponding vectorized representations for each of the respective synthetic prompts. In some embodiments, the synthetic prompts are generated based on metadata (e.g., media-item descriptors) related to media items available to be played back by the media-providing service. In some embodiments, a plurality of different synthetic prompts may be generated for each respective media-item descriptor of the plurality of media items stored by the vector-space model 410 (e.g., a first synthetic prompt including a question, and a second synthetic prompt including an affirmative command). By using different synthetic prompts corresponding to the same respective media-item descriptors (or other metadata related to the respective media items) the system 400 is able to account for distinct prompting styles, in accordance with some embodiments.

In some embodiments, the neural network may determine to forgo causing the vector representation to be generated for any portion of the text string 402. For example, the neural network 404 may determine that a structured query 405 generated based on the text string 402 would be sufficiently effective (e.g., based on a playlist scoring methodology) for identifying a set of media items without using the vector-space model 410. Alternatively, or additionally, the neural network 404 may determine (e.g., predict, based on world knowledge and/or additional training data) that generating the vector representation would not be effective for identifying media items based on a similarity between the vectorized representation of the portion of the text string 402 and the plurality of vectorized representations of media items stored in the vector-space model 410.

In accordance with receiving the structured query 405, the search algorithm 406 outputs a subset of media items 414 based on the structured query. After the subset of media items 414 is identified based on the structured query, additional operations may be performed by the system 400 to produce a sequenced set of media items 416 (e.g., generate a playlist) to provide to the user of the electronic device 102-1. In some embodiments, as part of providing the sequenced set of media items 416 to the user of the electronic device 102-1, the system 400 causes a visual representation (e.g., cover art) to be provided in conjunction with the sequenced set of media items 416. In some embodiments, the visual representation is generated using the neural network 404 (or a different neural network that is trained to generate images based on input text). In some embodiments, the visual representation is generated using the same text string 402 that was provided to the neural network 404 as part of identifying the sequenced set of media items 416.

In some embodiments, the neural network 404 may determine that neither the vector-space model 410 nor the search algorithm 406, either alone or in combination, will produce a suitable set of media items to provide to the user. Based on such a determination, the neural network 404 may instead determine (e.g., directly, without using other components of the system 400) a set of media items and/or identifying information for a set of media items to output based on the text string 402. That is, the neural network 404 may utilize its own world knowledge to directly output a set of media items to the user based on the text string 402.

Thus, in some embodiments, by identifying a set of media items to provide to a user by generating a vectorized representation of an input text string and modifying a resultant set of media items according to metadata identified from the user input, system 400 improves the efficiency of neural-network based approaches for identifying media items by exclusively using computationally-expensive neural network resources on portions of the user input for which such approaches are best suited (e.g., broad-query portions of the user input). The metadata field specifiers described herein, and derived from the user input, can be applied to the generated vector representation in a lightweight manner, e.g., by reducing (e.g., by filtering) the pool of media items that the vectorized representation of the user input string is compared against. Stated another way, by producing a vector for the "broad intent" language of the user query, selecting a pool of media items using the vector, then filtering the pool of media items (e.g., using metadata field specifiers derived from the user input), some embodiments of system 400 reduce the processing time and/or power required to handle queries, while still allowing the user to express "broad intent" preferences, by reducing the amount of computation that is performed by the neural network. This is especially true in contrast to approaches in which the computation load scales with the number of desired output tracks (e.g., approaches in which the model directly outputs identifiers of tracks).

It should be understood that although FIG. 4 provides an example of a structural diagram of a system architecture in which a neural network 404 is used to determine which search techniques to use to identify a set of media items based on the text string 402, the same or similar techniques may be used to refine an existing set of media items that has already been generated (e.g., based on a previous user-input text string). For example, a particular user may have a library of playlists generated using the same or different media-item-selection models (e.g., legacy models relying purely on search algorithms, vector-space models, and/or a combination of these and other techniques), and the user may provide a query stating, "add more funky beach party songs to playlist A" (where playlist A is a set of media items that was previously created by the user). In some embodiments, when a user provides a text string for refining an existing set of media items, information about the existing playlist (e.g., a set of media-item titles, artists, and/or media-item identifiers (e.g., media-item-locating URIs)) is provided to the neural network along with the text string for refining the existing set of media items.

Figure 5B:
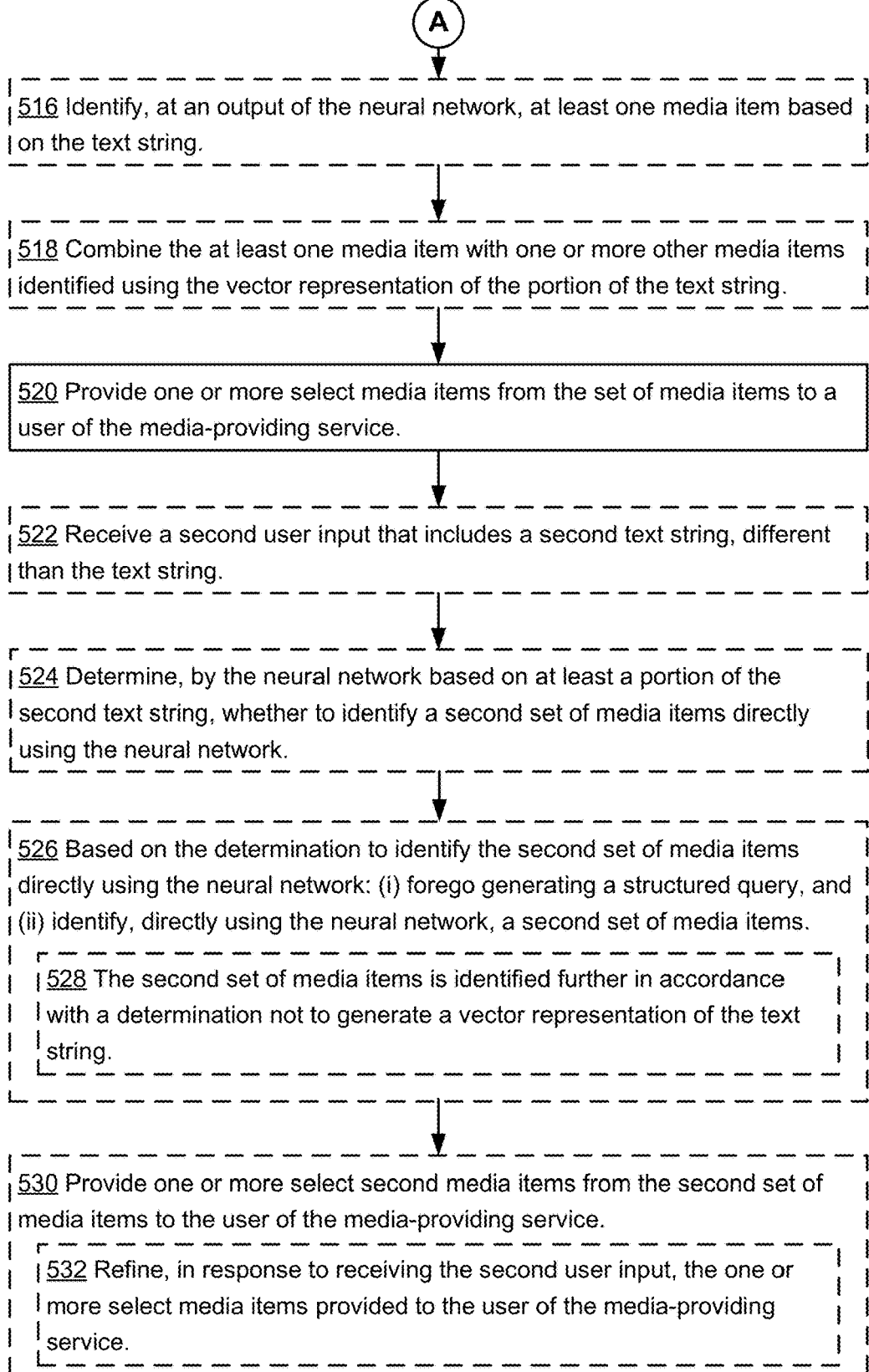

FIGS. 5A-5B are flow diagrams illustrating a method 500 of identifying sets of media items (e.g., playlists) to provide to users of a media-providing service by providing user-input text strings to a neural network (e.g., a generative model, such as a large language model), in accordance with some embodiments. For explanatory purposes, the various blocks of the method 500 are described herein with reference to FIGS. 1-4, and the associated components and/or processes described herein. Operations of the method 500 may be performed at the system 400, which may include one or more electronic devices (e.g., electronic device 102-1, media content server 104). For example, the system 400 may be included in non-transitory computer-readable media of the query module 226 of the electronic device 102-1, and/or the prompt playlisting module 320 of the media content server 104. In accordance with some embodiments, operations of the method 500 may be performed at multiple different devices. For example, a user of the media-providing service may provide the text string 402 at a user interface of a mobile application associated with the media-providing service (e.g., a streaming application), and the text string 402 may be provided to the media content server 104 in conjunction with performing one or more of the searching operations of the method 500, which are discussed in more detail below.

Referring now to FIG. 5A, the method 500 is performed at an electronic device associated with a media-providing service (e.g., a client device, such as the electronic device 102-1, and/or a remote server, such as the media content server 104), the electronic device having one or more processors and memory storing instructions for execution by the one or more processors (502). In some embodiments, the method 500 is performed by executing instructions stored in the memory (e.g., memory 212, FIG. 2, memory 306, FIG. 3) of the electronic device 102-1. In some embodiments, the method 500 is performed by the system 400 shown in FIG. 4, which may include a combination of a server system (e.g., including media content server 104 and CDN 106) and a client device (e.g., an example of the electronic device 102). For example, an input (e.g., a text string corresponding to an unstructured query) may be received at a user interface presented by the electronic device 102-1, and the input may be provided to a neural network (e.g., the neural network 404) that is stored at the media content server 104.

The system 400 stores (504), in a vector space (e.g., the vector-space model 410), a plurality of respective vector representations for respective media items. In some embodiments, the plurality of respective vector representations corresponds to all, or a portion less than all, of the media items available for playback by the media-providing service. In some embodiments, each respective vector representation represents a corresponding media content item and/or other information associated with the media content item (e.g., metadata including media-item descriptors of the media content item).

The system 400 receives (506) a user input that includes a text string (e.g., the text string 402). For example, the user may provide an unstructured search query (e.g., "beach party funk music") to a text input field within a search user interface associated with the media-providing service, and the text string 402 directly corresponds to the text input provided by the user to the text input field within the search user interface or text based on an audio input provided by the user. In some embodiments, the text string 402 includes modified (e.g., transformed) content based on the text input that the user provided to the text input field of the search user interface.

The system 400 generates (508), using the neural network 404, a structured query based on the text string 402. For example, FIG. 4 illustrates the neural network 404 (e.g., an LLM) receiving the text string 402 as an input (e.g., at an input layer of the neural network) and producing the structured query 405 as an output (e.g., at an output layer of the neural network) based on the content of the text string 402. In some embodiments, the structured query 405 includes instructions configured to be interpreted by a search algorithm (e.g., the search algorithm 406) to identify respective media items.

The system 400 determines (510) based on the structured query, whether to generate a vector representation (e.g., a stable vector) of a portion of the text string. For example, the neural network 404 may determine that a portion or all of the input text string corresponds to text having a broad intent, such as "funky music," and may determine to generate a vector representation for the portion of the text string 402. Stated another way, in some embodiments, the neural network 404 is trained to determine portions of the text string that correspond to "broad intent," which is then used to generate a vector representation of the portion. In some circumstances, broad intent means that the media providing service does not store metadata associated with media content items that would specifically indicate whether the intent is met. For example, the media providing service may store genre and sub-genre data associated with media content items, and one possible genre could be "funk music," but the neural network 404 determines that the term "funky music" is meant as a broader term than simply tracks in the genre funk. In contrast, some portions of the text string may be best suited for a rules-based approach. For example, when a user asks for "funky music with a tempo above 100 beats per minute," the neural network 404 may decide that the portion "above 100 beats per minute" would best be handled using a rule, which is output in the structured query. Note that, in some embodiments, generation of the vector representation is conditional on the neural network 404 determining that the portion of the text string has broad intent.

In accordance with a determination (512) to generate the vector representation of the portion of the text string (e.g. a descriptive portion), the system 400: (i) generates the vector representation of the portion of the text string, where the vector representation is embedded in the vector space in which the plurality of respective vector representations for respective media content items is stored (e.g., the vector-space model 410), and (ii) identifies a set of media items using the vector representation of the portion of the text string (e.g., by comparing the vector representation of the portion of the text string to some or all of the plurality of respective vector representations corresponding to respective media content items (e.g., using a nearest neighbor approach)). In some embodiments, the set of media items are identified from a catalog of media items. In some embodiments, the set of media items are identified from a subset of a catalog of media items (e.g. in which the subset is pre-selected using any sort of criteria, such as genre, listening history, media type, etc.). In some embodiments, the vector representation of the portion of the text string is used to sort (e.g. rank) media content items that were provided by other parts of the structured query (e.g., other parts of the structured query are used to identify a subset of the catalog of media items, which are thank ranked using the vector representation of the portion of the text string).

In some embodiments, the system 400 selects, using a search algorithm, a pool of media items based on at least a portion of the structured query (using metadata field specifiers). The system 400 provides a filtered pool of media items as the one or more select media items to the user (e.g., using a cosine similarity scoring technique). Identifying the set of media items using the vector representation of the portion of the text string includes filtering the pool of media items using the vector representation of the portion of the text string to produce the filtered pool of media items. For example, the neural network 404 may output a structured query 405 that causes the search algorithm 406 to identify a first subset of media items to provide to a user. After the search algorithm 406 identifies the first subset of media items (or concurrently with the search algorithm 406 identifying the first subset of media items), a vector representation may be generated based on the text string 402 and provided to the vector-space model 410. A second subset of media items may be identified by comparing vector representations of the respective media items of the first subset of media items to the vector representation of the text string 402. As another example, the structured query 405 may include instructions to cause a vector representation of a portion of the text string 402 to be generated, and a first subset of media items may be identified based on performing cosine similarity analysis on the vectorized representation of the text string 402, and the structured query 405 may also include one or more metadata field specifiers derived from the text string 402 (e.g., a BPM range filter). The one or more metadata field specifiers may be applied to the first subset of media items that were identified based on the cosine similarity analysis.

Thus, in some embodiments, by identifying a set of media items to provide to a user by generating a vectorized representation of an input text string and modifying a resultant set of media items according to metadata identified from the user input, the structured search query approach described herein improves the efficiency of neural-network based approaches for identifying media items by exclusively using computationally-expensive neural network resources on portions of the user input for which such approaches are best suited (e.g., broad-query portions of the user input). The metadata field specifiers described herein, and derived from the user input, can be applied to the generated vector representation in a lightweight manner, e.g., by reducing (e.g., by filtering) the pool of media items that the vectorized representation of the user input string is compared against. Stated another way, by producing a vector for the "broad intent" language of the user query, selecting a pool of media items using the vector, then filtering the pool of media items (e.g., using metadata field specifiers derived from the user input), some embodiments reduce the processing time and/ or power required to handle queries, while still allowing the user to express "broad intent" preferences, by reducing the amount of computation that is performed by the neural network. This is especially true in contrast to approaches in which the computation load scales with the number of desired output tracks (e.g., approaches in which the model directly outputs identifiers of tracks).

Turning now to FIG. 5B, in some embodiments, the system 400 identifies (516), at an output of the neural network, at least one media item based on the text string. In some embodiments, the system 400 causes the neural network 404 to directly identify media items using the world knowledge of the neural network 404 based on a determination or a prediction that generating a structured query to identify the set of media did not and/or will not be effective for identifying a set of media items to provide to the user. For example, the neural network 404 may first output a structured query 405, and may receive an indication from the system 400 that the structured query 405 failed to effectively identify a set of media items to provide to the user. For example, the system 400 may indicate that providing the structured query 405 to the search algorithm 406 would only result in a set of media items that includes a single media item. In some embodiments, the neural network directly identifies media items based on a determination that the text string is best dealt with using world knowledge, for example, if the user were to state, "Make a playlist for Charles Dickens's 'A Christmas Carol'." Such a query is better dealt with using the world knowledge on which neural network 404 is trained, rather than specific knowledge of media items provided by the media providing service, because few if any media items provided by the media providing service will be directly associated with Charles Dickens's "A Christmas Carol." Rather, the neural network 404 may use world knowledge relating to context surrounding Charles Dickens's "A Christmas Carol," which the model "understands" because it has been trained on a large corpus of generalized data, to produce relevant media items.

Note that, in some embodiments, this process is different than generating a vector representation of a portion of the query that has broad intent. Thus, in some embodiments, there are at least two ways that a user's query can be handled: (i) the neural network may decide to identify media items directly using the user's query, as the user's query is best handled using "world knowledge," or (ii) the neural network may decide to output a structured query from the user's query. Under the second approach, if the user's query has a portion with broad intent, the structured query may include a call to another portion of the model which generates a vector representation of the portion of the user's query that has broad intent.

In some embodiments, the system 400 combines (518) the at least one media item with one or more other media items that were identified using the vector representation of the portion of the text string (or via another portion of the structured query). For example, the neural network 404 may output the structured query 405 based on the text string 402, and a set of three media items may be identified using the structured query 405. Then the neural network 404 may output media-item identifiers corresponding to five other media items, and a resultant set of media items may be provided to the user that includes the set of three media items identified using the structured query 405 and the five other media items that were identified using the world knowledge of the neural network 404.

The system 400 provides (520) one or more select media items from the set of media items to a user of the media-providing service. In some embodiments, the neural network may determine to generate a title and cover art for a playlist that includes the set of media items. In some embodiments, cover art is generated by a different generative model of the system 400 (e.g., using a different LLM or image-generating model). In some embodiments, the cover art and/or title of the playlist is identified from existing content of the media-providing service. For example, art associated with a particular producer may be used to represent the set of media items (e.g., based on a number of media items produced by the producer within the set of media items provided to the user).

Thus, by using the neural network to generate a structured query to identify media items (e.g., either alone or in combination with a vector representation of the user input), instead of using the neural network to directly identify a set of media items in all cases, the systems and methods described herein reduce the processing time required to generate an output that can be used to fulfill the user's request. For example, methods in which a neural network directly outputs and/or identifies media items require either that all of the information used to select the media items be fed into the neural network, or that the neural network generates a pool of media items that can then be filtered. In either case, these approaches require multiple passes through a relatively "heavy" neural network (e.g., a computationally-intensive neural network) in order to produce additional media items. In contrast, in some embodiments, the systems and methods described herein can provide improvements in processing time by outputting a relatively simple structured query. In addition, the vector that is conditionally generated only has to be generated once for a given query, and then can be reused for additional purposes if necessary.

In some embodiments, the system 400 receives (522) a second user input that includes a second text string, different than the text string. In some embodiments, the user provides the text input at a user interface associated with a set of media items that has already been generated or otherwise obtained without using the neural network 404 and/or other components of the system 400.

In some embodiments, the text string is a first text string. The system 400 determines (524), by the neural network (or a different model and/or algorithm) based on at least a portion of the second text string, whether to identify a second set of media items directly using the neural network. For example, the neural network can be trained to determine whether the user's query would be best handled using the "world-knowledge" of the neural network, rather than the media-item-specific knowledge that is present in the vectorization and metadata field specifiers generated as part of the structured query, thus performing the computationally-expensive process of using the neural network to directly identify media items when it is better suited for doing so, thereby improving the processing efficiency of this computer-based process.

In some embodiments, based on the determination to identify the second set of media items directly using the neural network (526), the system 400 (*i*) forgoes generating a structured query, and (ii) identifies, directly using the neural network (e.g., at an output of the neural network), a second set of media items (e.g., a set of media-item descriptors, such as a song name, an artist name, and/or a URI, that can be used to identify a particular media item from a plurality of media items associated with the media-providing service).

In some embodiments, the second set of media items is identified further in accordance with a determination not to generate a vector representation of the text string (528). Thus, by providing a flexible approach for accessing different methodologies for searching media items, the systems and methods provided herein efficiently (e.g., in terms of computational expense) make use of the different approaches based on the nature of a given input query (e.g., text string). For example, the system may recognize that the input text string provided by the user can be effectively converted into a symbolic representation (e.g., a structured query, machine-readable code configured to be interpreted by an interpreter specific to the playlisting module 320) that can be interpreted by one or more models and/or algorithms, which may be utilizing data specific to the media-providing service. And the system may recognize that another input text string provided by the user (e.g., at a different time) would be more effectively used to generate an input to the LLM to directly identify media items based on its world knowledge.

In some embodiments, the system 400 provides (530) one or more select media items from the second set of media items to the user of the media-providing service. In some embodiments, the select media items from the second set of media items replace one or more media items of the set of media items that were provided to the user based on the initial text string that the user provided to the neural network 404. In some embodiments, the one or more select media items from the second set of media items are added to the select media items that were provided to the user based on the first input text.

In some embodiments, the system 400 refines (532), in response to receiving the second user input, the one or more select media items provided to the user of the media-providing service (e.g., based on generating a new prediction vector and/or modifying the vector representation for the text string the user previously input to cause the plurality of media content items to be provided).

By adaptively selecting how to process a user input text string to identify and/or refine a set of media items to provide to a user, the system 400 provides improved flexibility for providing text strings that are oriented for different types of selection techniques (e.g., a search algorithm, a vector-based model, and/or a neural network).

In some embodiments, the neural network is a first neural network, and generating the vector representation of the input text includes applying the portion of the text string to a second neural network. The method further includes applying the portion of the text string to a second neural network of the system 400 (e.g., alternatively, or additionally applying the vector representation to the vector-space model 410). In some embodiments, the second neural network of the system 400 is trained by providing a plurality of synthetic prompts to the second neural network, where the plurality of synthetic prompts includes two or more respective prompts for a same set of media-item descriptors associated with the respective media content items. That is, there may be a predefined set of templates (e.g., including a template: "<genre> music for <activity> with <instrument>"), and a media-item descriptor may be applied to multiple templates, such that different vectors are generated for distinct ways of providing similar query content.

In some embodiments, the training includes applying a contrastive loss training objective to the plurality of synthetic prompts. In some embodiments, the contrastive loss training objective applied to the plurality of synthetic prompts while training the second neural network is a supervised learning technique, and the first neural network is a language model fine-tuned or instructed to generate structured queries based on text strings. In some embodiments, the first neural network is trained to produce textual outputs using an unsupervised learning technique. In some embodiments, the first neural network is trained using a so-called "self-supervised learning," in which portions of the textual input are masked internally by the model, which then learns to produce what was masked. In this way, the system 400 achieves unique technical improvements by leveraging world knowledge of the neural network obtained using the unsupervised learning approach inherent in the training of the neural network, while also utilizing aspects of the supervised learning techniques for using the synthetic prompts generated using the data about the particular media items available for playback by the media-providing service.

Although FIGS. 5A-5B illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A method, comprising:
at an electronic device associated with a media-providing service, the electronic device having one or more processors and memory storing instructions for execution by the one or more processors:
    storing, in a vector space, a plurality of respective vector representations for respective media content items;
    receiving a user input that includes a first text string;
    generating, using a neural network, a structured query based on a first portion of the first text string;
    identifying, based on the structured query, a pool of candidate media items, selected from the respective media content items represented by the plurality of respective vector representations;

determining, based on the structured query, to generate a vector representation of a second portion of the first text string;
in accordance with the determination to generate the vector representation of the second portion of the first text string:
    generating the vector representation of the second portion of the first text string, wherein the vector representation is embedded in the vector space in which the plurality of respective vector representations for respective media content items is stored; and
    identifying a first set of media items from the pool of candidate media items using the vector representation of the second portion of the first text string;
providing one or more select first media items from the first set of media items to a user of the media-providing service;
receiving a second user input that includes a second text string, different than the first text string;
determining, by the neural network based on at least a portion of the second text string, to identify a second set of media items using the neural network without generating a structured query; and
based on the determination to identify the second set of media items using the neural network without generating a structured query:
    forgoing generating a structured query;
    identifying, directly using the neural network, a second set of media items; and
providing one or more select second media items from the second set of media items to the user of the media-providing service.

2. The method of claim 1, further comprising:
selecting, using a search algorithm, the pool of candidate media items based on at least a portion of the structured query; and
providing a filtered pool of candidate media items as the one or more select first media items to the user;
wherein identifying the first set of media items using the vector representation of the second portion of the first text string includes filtering the pool of candidate media items using the vector representation of the second portion of the first text string to produce the filtered pool of candidate media items.

3. The method of claim 1, further comprising:
identifying, at an output of the neural network, at least one media item based on the first text string; and
combining the at least one media item with one or more other media items identified using the vector representation of the second portion of the first text string.

4. The method of claim 1, wherein:
the second set of media items is identified further in accordance with a determination to not generate a vector representation of the second text string.

5. The method of claim 1, further comprising:
receiving a third user input that includes a third text string;
in response to receiving the third user input that includes the third text string, refining the one or more select first media items provided to the user of the media-providing service.

6. The method of claim 1, wherein the neural network is a first neural network,
generating the vector representation of the second portion of the first text string includes applying the second portion of the first text string to a second neural network, and the method further includes:

training the second neural network by providing a plurality of synthetic prompts to the second neural network, wherein the plurality of synthetic prompts includes two or more respective prompts for a same set of media-item descriptors associated with the respective media content items.

7. The method of claim 6, wherein the training includes applying a contrastive loss training objective to the plurality of synthetic prompts.

8. The method of claim 7, wherein:

the contrastive loss training objective applied to the plurality of synthetic prompts while training the second neural network is a supervised learning technique; and the first neural network is a language model fine-tuned or instructed to generate structured queries based on text strings.

9. A computer system associated with a media-providing service, comprising:

one or more processors; and memory storing one or more programs for execution by the one or more processors, the one or more programs comprising instructions for:

storing, in a vector space, a plurality of respective vector representations for respective media content items;

receiving a user input that includes a first text string;

generating, using a neural network, a structured query based on a first portion of the first text string;

identifying, based on the structured query, a pool of candidate media items, selected from the respective media content items represented by the plurality of respective vector representations;

determining, based on the structured query, whether to generate a vector representation of a second portion of the first text string;

in accordance with a determination to generate the vector representation of the second portion of the first text string:

generating the vector representation of the second portion of the first text string, wherein the vector representation is embedded in the vector space in which the plurality of respective vector representations for respective media content items is stored; and identifying a first set of media items from the pool of candidate media items using the vector representation of the second portion of the first text string;

providing one or more select first media items from the first set of media items to a user of the media-providing service;

receiving a second user input that includes a second text string, different than the first text string;

determining, by the neural network based on at least a portion of the second text string, to identify a second set of media items using the neural network without generating a structured query; and based on the determination to identify the second set of media items using the neural network without generating a structured query:

forgoing generating a structured query;

identifying, directly using the neural network, a second set of media items; and providing one or more select second media items from the second set of media items to the user of the media-providing service.

10. The computer system of claim 9, wherein the one or more programs further comprise instructions for:

selecting, using a search algorithm, the pool of candidate media items based on at least a portion of the structured query; and providing a filtered pool of candidate media items as the one or more select first media items to the user;

wherein identifying the first set of media items using the vector representation of the second portion of the first text string includes filtering the pool of candidate media items using the vector representation of the second portion of the first text string to produce the filtered pool of candidate media items.

11. The computer system of claim 9, wherein the one or more programs comprising instructions for:

identifying, at an output of the neural network, at least one media item based on the first text string; and combining the at least one media item with one or more other media items identified using the vector representation of the second portion of the first text string.

12. The computer system of claim 9, wherein:

the second set of media items is identified further in accordance with a determination to not generate a vector representation of the second text string.

13. The computer system of claim 9, wherein one or more programs comprising instructions for:

receiving a third user input that includes a third text string;

in response to receiving the third user input that includes the third text string, refining the one or more select first media items provided to the user of the media-providing service.

14. The computer system of claim 9, wherein the neural network is a first neural network, generating the vector representation of the second portion of the first text string includes applying the second portion of the first text string to a second neural network, and the one or more programs comprising instructions for:

training the second neural network by providing a plurality of synthetic prompts to the second neural network, wherein the plurality of synthetic prompts includes two or more respective prompts for a same set of media-item descriptors associated with the respective media content items.

15. The computer system of claim 14, wherein the training includes applying a contrastive loss training objective to the plurality of synthetic prompts.

16. The computer system of claim 15, wherein:

the contrastive loss training objective applied to the plurality of synthetic prompts while training the second neural network is a supervised learning technique; and the first neural network is a language model fine-tuned or instructed to generate structured queries based on text strings.

17. A non-transitory computer-readable storage medium storing one or more programs configured for execution by a computer system, the one or more programs comprising instructions for:

storing, in a vector space, a plurality of respective vector representations for respective media content items;

receiving a user input that includes a first text string;

generating, using a neural network, a structured query based on a first portion of the first text string;

identifying, based on the structured query, a pool of candidate media items, selected from the respective media content items represented by the plurality of respective vector representations;

determining, based on the structured query, whether to generate a vector representation of a second portion of the first text string;

in accordance with a determination to generate the vector representation of the second portion of the first text string:

generating the vector representation of the second portion of the first text string, wherein the vector representation is embedded in the vector space in which the plurality of respective vector representations for respective media content items is stored; and identifying a first set of media items from the pool of candidate media items using the vector representation of the second portion of the first text string;

providing one or more select media items from the first set of media items to a user of a media-providing service;

receiving a second user input that includes a second text string, different than the first text string;

determining, by the neural network based on at least a portion of the second text string, to identify a second set of media items using the neural network without generating a structured query; and based on the determination to identify the second set of media items using the neural network without generating a structured query:

forgoing generating a structured query;

identifying, directly using the neural network, a second set of media items; and providing one or more select second media items from the second set of media items to the user of the media-providing service.

18. The non-transitory computer-readable storage medium of claim 17, wherein the one or more programs comprising instructions for:

selecting, using a search algorithm, the pool of candidate media items based on at least a portion of the structured query; and providing a filtered pool of candidate media items as the one or more select media items to the user;

wherein identifying the first set of media items using the vector representation of the second portion of the first text string includes filtering the pool of candidate media items using the vector representation of the second portion of the first text string to produce the filtered pool of candidate media items.

\* \* \* \* \*